US008607276B2

(12) United States Patent
Chang et al.

(10) Patent No.: US 8,607,276 B2
(45) Date of Patent: Dec. 10, 2013

(54) SYSTEMS AND METHODS TO SELECT A KEYWORD OF A VOICE SEARCH REQUEST OF AN ELECTRONIC PROGRAM GUIDE

(75) Inventors: Hisao Chang, Cedar Park, TX (US); Jia Wang, Randolph, NJ (US)

(73) Assignee: AT&T Intellectual Property, I, L.P., Atlanta, GA (US)

( * ) Notice: Subject to any disclaimer, the term of this patent is extended or adjusted under 35 U.S.C. 154(b) by 43 days.

(21) Appl. No.: 13/309,954

(22) Filed: Dec. 2, 2011

(65) Prior Publication Data

US 2013/0145400 A1 Jun. 6, 2013

(51) Int. Cl.
*G06F 3/00* (2006.01)
*H04H 9/00* (2006.01)
*H04N 7/16* (2011.01)
*G10L 17/00* (2013.01)
*G10L 15/04* (2013.01)
*G10L 11/00* (2006.01)
*G10L 21/00* (2013.01)

(52) U.S. Cl.
USPC ...... 725/53; 725/9; 725/14; 725/22; 704/246; 704/251; 704/270.1; 704/275

(58) Field of Classification Search
USPC ......... 725/53, 9, 14, 22; 704/246, 251, 270.1, 704/275
See application file for complete search history.

(56) References Cited

U.S. PATENT DOCUMENTS

| | | |
|---|---|---|
| 6,714,631 B1 | 3/2004 | Martin et al. |
| 6,792,096 B2 | 9/2004 | Martin et al. |
| 7,050,560 B2 | 5/2006 | Martin et al. |
| 7,062,018 B2 | 6/2006 | Martin et al. |
| 7,136,476 B2 | 11/2006 | Martin et al. |
| 7,146,383 B2 | 12/2006 | Martin et al. |
| 7,222,072 B2 | 5/2007 | Chang |
| 7,356,475 B2 | 4/2008 | Novack et al. |
| 7,415,106 B2 | 8/2008 | Chang |
| 7,443,960 B2 | 10/2008 | Martin et al. |
| 7,460,652 B2 | 12/2008 | Chang |
| 7,567,901 B2 | 7/2009 | Chang |
| 7,657,005 B2 | 2/2010 | Chang |
| 7,848,509 B2 | 12/2010 | Chang |

(Continued)

FOREIGN PATENT DOCUMENTS

| | | | |
|---|---|---|---|
| EP | 1033701 A2 | 9/2000 | |
| EP | 2113847 A2 | 11/2009 | |
| WO | WO2011059258 A2 | 5/2011 | |

OTHER PUBLICATIONS

Grabianowski, Ed, "How Speech Recognition Works," A Discovery Company <http://electronics.howstuffworks.com/gadgets/high-tech-gadgets/speech-recognition.htm/printable> retrieved Nov. 22, 2011, 4 pages.

(Continued)

*Primary Examiner* — Hoang-Vu A Nguyen-Ba
(74) *Attorney, Agent, or Firm* — Toler Law Group, PC

(57) ABSTRACT

A particular method includes determining estimated popularity scores for programs identified in an electronic program guide for a time interval. The programs identified in the electronic program guide for the time interval include programs being aired. One or more estimated popularity scores are based on viewing trends of the programs being aired. The method also includes determining a voice search vocabulary based on the estimated popularity scores. The voice search vocabulary includes one or more keywords usable for a keyword search of the electronic program guide during the time interval based on a received voice search request.

20 Claims, 5 Drawing Sheets

(56) References Cited

U.S. PATENT DOCUMENTS

| | | |
|---|---|---|
| 7,873,029 B2 | 1/2011 | Chang et al. |
| 7,881,451 B2 | 2/2011 | Chang |
| 7,912,201 B2 | 3/2011 | Martin et al. |
| 2006/0010464 A1 | 1/2006 | Azami |
| 2006/0235684 A1 | 10/2006 | Chang |
| 2006/0236343 A1 | 10/2006 | Chang |
| 2006/0259478 A1 | 11/2006 | Martin et al. |
| 2007/0011133 A1 | 1/2007 | Chang |
| 2007/0106724 A1 | 5/2007 | Gorti et al. |
| 2007/0286360 A1 | 12/2007 | Chu |
| 2007/0299670 A1 | 12/2007 | Chang |
| 2008/0027730 A1 | 1/2008 | Novack et al. |
| 2008/0066131 A1 | 3/2008 | Chang et al. |
| 2008/0291894 A1 | 11/2008 | Chang et al. |
| 2009/0028302 A1 | 1/2009 | Chang |
| 2009/0034694 A1 | 2/2009 | Martin et al. |
| 2009/0220064 A1 | 9/2009 | Gorti et al. |
| 2009/0259470 A1 | 10/2009 | Chang |
| 2009/0259473 A1 | 10/2009 | Chang et al. |
| 2009/0287486 A1 | 11/2009 | Chang |
| 2009/0288118 A1 | 11/2009 | Chang |
| 2009/0319276 A1 | 12/2009 | Chang et al. |
| 2009/0320076 A1 | 12/2009 | Chang |
| 2010/0142684 A1 | 6/2010 | Chang et al. |
| 2010/0169088 A1 | 7/2010 | Johnston et al. |
| 2011/0067059 A1 | 3/2011 | Johnston et al. |
| 2011/0123004 A1 | 5/2011 | Chang et al. |

OTHER PUBLICATIONS

International Search Report and Written Opinion of the International Searching Authority for International Application No. PCT/US2012/065901, Mailed on Jan. 30, 2013, 9 pages.

SYSTEMS AND METHODS TO SELECT A KEYWORD OF A VOICE SEARCH REQUEST OF AN ELECTRONIC PROGRAM GUIDE

FIELD OF THE DISCLOSURE

The present disclosure is generally related to facilitating a voice search of available media content.

BACKGROUND

Media content service providers may provide subscribers with an electronic program guide (EPG) to enable the subscribers to determine what media content is available and what media content to view. The media content service providers may also provide subscribers with information regarding available on-demand media content. The media content service providers may enable the subscribers to search the EPG, the information regarding the available on-demand media content, or both to receive a search result of one or more identifiers of media content. For example, a service provider may enable a subscriber to specify search criteria via an input device (e.g., a remote control device, a touch screen, or a keyboard). A search of the electronic program guide, the information regarding available on-demand media content, or both may yield one or more media content items that satisfy the search criteria.

DETAILED DESCRIPTION

Figure 1:
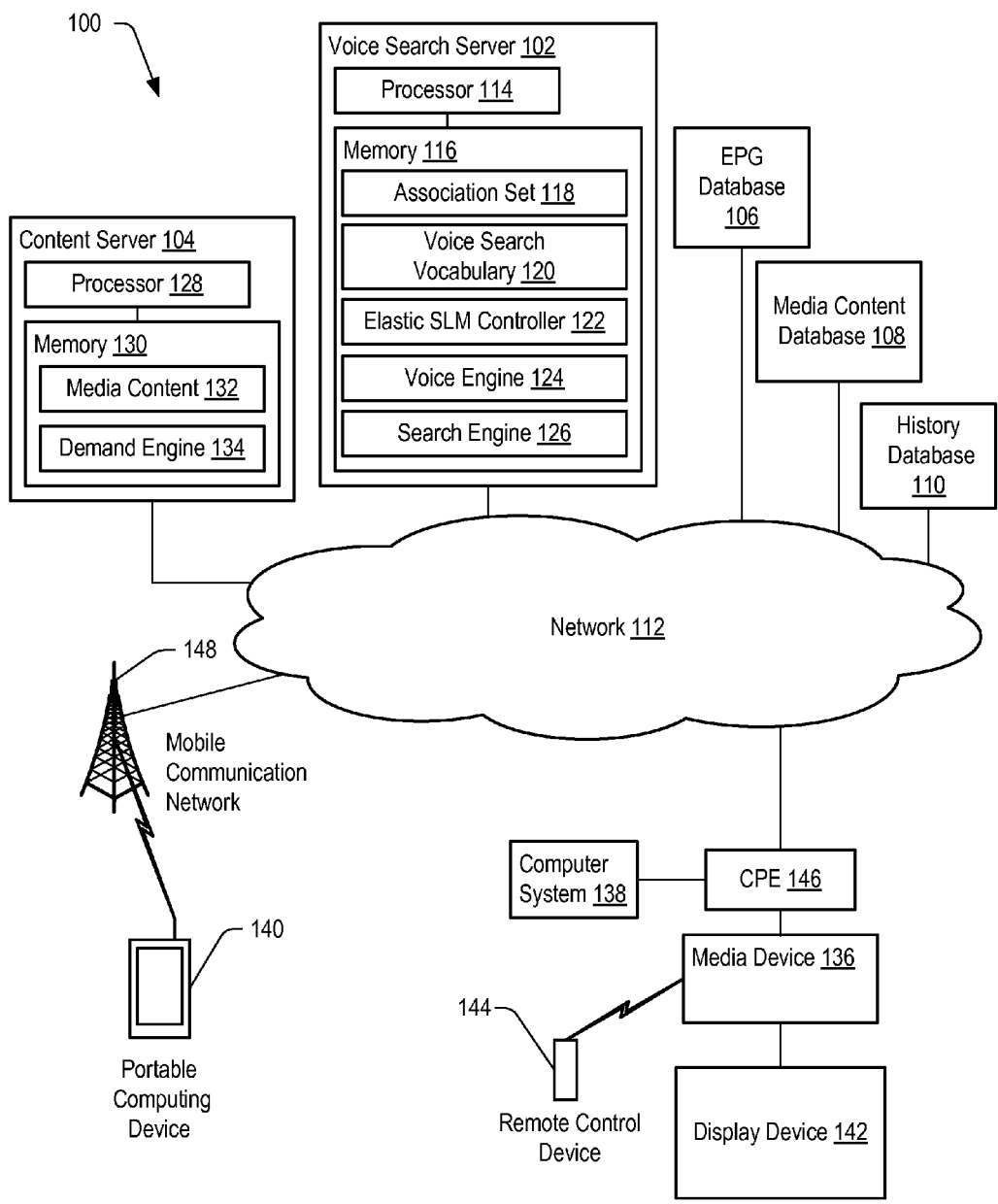
FIG. 1 is a block diagram of an embodiment of a system to facilitate a voice search of available media content.

A voice search request to determine available media content from an electronic program guide (EPG), an on-demand service, or both may be received by a network server, such as a voice search server. Prior to receipt of the voice search request, the voice search server may establish an association set for a time interval corresponding to a block of programming in the EPG. Entries in the association set may be based on estimated popularity scores for programming in the time interval and for selected media content available through the on-demand service. The association set may be used to generate a voice search vocabulary of keywords. When the voice search request is received, the voice search server may determine keywords for a keyword search from the voice search vocabulary based on the voice search request. The voice search server may search the EPG and a database associated with the on-demand service based on the keywords determined from the voice search vocabulary to produce a search result. Weight factors for programs and media content in the association set may be used to limit a number of media content items identified in the search result, to order the media content items of the search result, or both. The search result may be sent to a device associated with a user that initiated the voice search request. Basing the search result on the use of the voice search vocabulary and the association set for the time interval may increase the efficiency of obtaining the search result and the accuracy of the obtained search result.

In a particular embodiment, a method includes determining, at a server, estimated popularity scores for programs identified in an electronic program guide for a time interval. The programs identified in the electronic program guide for the time interval include programs being aired. One or more estimated popularity scores are based on viewing trends of the programs being aired. The method also includes determining, at the server, a voice search vocabulary based on the estimated popularity scores. The voice search vocabulary includes one or more keywords for a keyword search of the electronic program guide during the time interval based on a received voice search request.

In a particular embodiment, a system includes a processor and a memory coupled to the processor. The memory includes instructions executable by the processor to determine estimated popularity scores for programs identified in an electronic program guide for a time interval. The programs identified in the electronic program guide for the time interval include programs being aired. One or more estimated popularity scores are based on viewing trends of the programs being aired. The memory also includes instructions executable by the processor to determine a voice search vocabulary based on the estimated popularity scores. The voice search vocabulary includes one or more keywords for a keyword search of the electronic program guide during the time interval based on a received voice search request.

In a particular embodiment, a tangible computer readable medium includes instructions. The instructions are executable by a processor to determine an association set that associates programs included in an electronic program guide for a time interval to identifiers of keywords. The keywords are usable to search the electronic program guide during the time interval to identify programs in the electronic program guide. The instructions are executable by the processor to determine estimated popularity scores for programs identified in the electronic program guide for the time interval. The instructions are executable by the processor to remove from the association set an association of at least one first keyword identifier to a first program with an estimated popularity score that satisfies a low threshold for the first program. The instructions are executable by the processor to adjust weight factors of keyword identifier associations to particular programs in the association set based on the estimated popularity scores. The instructions are also executable by the processor to determine a voice search vocabulary from the association set, wherein the voice search vocabulary includes keywords corresponding to unique keyword identifiers in the association set.

FIG. 1 is a block diagram of a particular embodiment of a system 100 to facilitate a search of available media content based on keywords determined from a voice search request. The system 100 may include a voice search server 102, a content server 104, an EPG database 106, a media content database 108, a history database 110, one or more additional servers or databases, or a combination thereof.

The voice search server 102 may process voice search requests received via a network 112 to determine search results of available media content that satisfies or at least partially satisfies criteria included in the voice search requests. The network 112 may include one or more private networks to provide subscription content (e.g., content delivered via a cable television network, an internet protocol television network, or a satellite television network, etc.), one or more other private networks, the internet, or combinations thereof. The voice search server 102 may process voice search requests for a particular geographical region. Other voice search servers may process voice search requests for other geographic regions.

The voice search server 102 may include a processor 114 and a memory 116. The memory 116 may store data that may include information used to process voice search requests. The information may include an association set 118 and a voice search vocabulary 120. The association set 118 may include identifiers of keywords that are associated with identifiers of programs included in an EPG for a time interval, identifiers of keywords associated with identifiers of media content available from an on-demand service, or both. The association set 118 may also include weight factors for each association of a keyword to either a program identifier or to a media content identifier. The programs may include programs available to subscribers of a service provider including programs that are currently being aired by the service provider (e.g., transmitted, broadcast, or otherwise made available to viewers). The time interval may correspond to a block of programming available from the service provider. The time interval may be a particular time interval set for the voice search server 102. For example, the time interval may be a 15-minute time period, a 30-minute time period, a one-hour time period, a one and a half hour time period, a two-hour time period, or another time period set for the voice search server 102. The voice search vocabulary 120 may include a listing of keywords corresponding to unique keyword identifiers of the association set 118. For example, a particular keyword identifier in the association set may be associated with several different programs. The keyword corresponding to the keyword identifier may only be included in the voice search vocabulary 120 a single time.

The data of the memory 116 may also include instructions executable by the processor 114 to perform tasks. For purposes of description, instructions for the voice search server 102 are illustrated in FIG. 1 as organized in functional modules. For example, the voice search server 102 may include an elastic spoken language model controller 122, a voice engine 124, and a search engine 126.

The elastic spoken language model controller 122 may create and maintain the association set 118 and the voice search vocabulary 120. The elastic spoken language model controller 122 may calculate estimated popularity scores for the programs included in the EPG during the time interval, estimated popularity scores for content available via the on-demand service, or both. The association set 118 and the voice search vocabulary 120 may be updated when the elastic spoken language model controller 122 determines new estimated popularity scores. New estimated popularity scores may be calculated when the voice search server 102 receives viewing information from the content server 104 for programs currently being aired. New estimated popularity scores may also be calculated when the voice search server 102 receives information that changes the estimated popularity scores of media content available from the on-demand service. For example, the voice search server 102 may query the media content database 108, the history database 110, or both for information about media content that is popular during a particular season (e.g., the Christmas season) when the particular season begins. When the voice search server 102 receives information about the media content that is popular during the particular season, estimated popularity scores for the media content may be calculated. Similarly, when a particular season ends, estimated popularity scores for media content associated with the season that ended may be calculated to determine whether associations to the media content associated with the season should be removed from the association set 118.

The voice engine 124 may receive a voice search request from a subscriber and determine a voice search result based on a comparison of the voice search request to entries in the voice search vocabulary 120. The voice search result may include or indicate one or more keywords from the voice search vocabulary 120. The search engine 126 may use the voice search result to search one or more databases to determine a search result. For example, the search engine 126 may search the EPG database 106, the media content database 108, or both. The search result may include information identifying at least one program, information identifying media content, or both, that corresponds to search criteria determined from the voice search request.

The content server 104 may provide media content to one or more subscribers. The media content may include scheduled programs and on-demand media content (e.g., movies, pay-per-view events, and games). The content server 104 may include a processor 128 and a memory 130. The memory 130 may store data that may include temporary or long term storage of media content 132 available to subscribers. The media content 132 may be received from one or more content providers. The data of the memory 130 may also include instructions executable by the processor 128 to perform tasks. For example, the content server 104 may include a set of instructions organized as a demand engine 134. The demand engine 134 may provide statistical information, other information, or both for programs, media content, channels, or combinations thereof to the history database 110. The demand engine 134 may also provide information about viewing trends of programs currently being aired, information about media content available from the on-demand service currently being provided to subscribers, or both to the elastic spoken language model controller 122 of the voice search server 102. The demand engine 134 may send information to the elastic spoken language model controller 122 at fixed time intervals (e.g., every 3 minutes, 5 minutes, 7 minutes, or another selected time period), at event driven time points (e.g., 3 minutes or another selected time period after a commercial break ends and 10 minutes or another selected time period before a program is to end), and when one or more thresholds are satisfied.

The thresholds may include, but are not limited to, an outflow trend threshold, an inflow trend threshold, and a high intensity threshold. The outflow trend threshold may be satisfied when a total number of viewers leaving a particular program group during a first time period exceeds a total number of viewers tuning to the particular program group during the first time period by a selected ratio (e.g., by a ratio of 1.1, 1.5, 2, or other selected ratio). The particular program group may correspond to a particular program, a particular channel or a group of related channels (e.g., a number of sport channels showing different games of a particular sport or different views of a particular game). The inflow trend threshold may be satisfied when a total number of viewers joining the particular program group during a first time period exceeds a total number of viewers leaving the particular program group during the first time period by a selected ratio (e.g., by a ratio 1.1, 1.5, 2, or other selected ratio). The high intensity threshold may be satisfied when a total number of viewers joining the particular program group during a first time period exceeds a total number of viewers leaving the particular program group during the first time period and the viewers joining the particular program stay with the channel for at least a second time period (e.g., 10 minutes, 15 minutes, or another time period). When computing trends, variables may be adjusted to compensate for circumstances that may skew results. For example, stay times of certain viewers may be adjusted downwards to compensate for viewers that join a channel and quit viewing without turning off the device used to receive the channel. Stay times for viewers that tune away from a particular channel during certain periods (e.g., during commercials) and return to the particular channel after the periods may also be adjusted to reduce or eliminate the influence of leaving the channel during the certain periods.

The EPG database 106 may include data for scheduled programming to be provided to, or made available to, subscribers. The data may be provided by or on behalf of the service provider that makes the scheduled programming available to the subscribers. The data may include a scheduled time for a program (e.g., a start time, an end time, a duration, or combinations thereof), a channel showing the program, information about the program, other information, and combinations thereof.

The media content database 108 may include data for media content available through the on-demand service. The media content may include movies, pay-per-view events (e.g., telecasts of live sporting events), games, other media content, or combinations thereof. The data may include information about the media content, time and channel for the media content when applicable, information descriptive of the media content, other information, and combinations thereof.

The history database 110 may include historical data pertaining to programs and media content. The historical data may include statistical data for geographical regions related to viewing of programs, channels, media content, and combinations thereof for selected time periods (e.g., hours, days of a week, months, seasons (e.g., spring, summer, fall, winter, holiday seasons, sports seasons, television seasons, etc.)), holidays, and years.

The system 100 may allow devices associated with the service provider (e.g., the voice search server 102 and the content server 104) to communicate with devices associated with subscribers via the network 112. For example, a media device 136, a computer system 138, and a portable computing device 140 may be associated with a particular subscriber. Other subscribers may be associated with fewer devices, more devices, or different devices.

The media device 136 may be a set-top box device or another device able to send subscription media content (e.g., television programming and on-demand media content) received from the service provider via the network 112 and other content received via the network 112 to a display device 142. A remote control device 144 may be used to send commands to the media device 136, the display device 142, or both. The remote control device 144 may include a microphone. A user of the remote control device 144 may speak a voice entry into the microphone. The voice entry may be the voice search request, a command, or other voice message. The remote control device 144 may forward the voice entry to the media device 136. In some embodiments, the user may utilize a button of the remote control device 144 to activate the microphone, deactivate the microphone after the voice entry is spoken, or both.

The media device 136 and the computer system 138 may be located at a customer premises. The customer premises may be a residence, a business location, or other location. The media device 136 and the computer system 138 may receive data from, and send data to, the network 112 via customer premises equipment (CPE) 146. The CPE 146 may include a router, a local area network device, a modem (e.g., a digital subscriber line (DSL) modem or a cable modem), a residential gateway, another communication device, or combinations thereof. The CPE 146 may establish a local area network (LAN) that enables wireless communications. The media device 136 and the computer system 138 may be coupled to the CPE 146 by wired connections (e.g., fiber optic cables, Ethernet cables, high-definition multimedia interface (HDMI) cables, other type of connections, or combinations thereof), by wireless connections via the LAN, or both.

The portable computing device 140 may be, but is not limited to, a mobile communication device, a tablet computer, a personal digital assistant, a lap top computer, another type of communication device, or combinations thereof. When the portable computing device 140 is within a range of the LAN, the portable computing device 140 may communicate with the network 112 via a wireless connection to the CPE 146. When the portable computing device 140 is not within the range of the LAN, the portable computing device 140 may communicate with the network 112 via a mobile communication network 148 or via a connection to a different LAN than the LAN established by the CPE 146.

The system 100 may be used to provide a voice search result to a device in response to a received voice search request. In a particular illustrative embodiment, a user may submit a voice entry via the microphone of the remote control device 144. A processor of the media device 136 may receive the voice entry from the remote control device 144, determine that the voice entry is a voice search request, and forward the voice search request to the voice search server 102. In another embodiment, the user may submit the voice search request to the voice search server 102 via the computer system 138 or the portable computing device 140. When the user uses the computer system 138 or the portable computing device 140 to submit the voice search request, the user may be presented with a user interface that includes an option to select a device where the search result is to be returned. The user may elect to have the search result returned to the computer system 138, the portable computing device 140, the display device 142 via the media device 136, or to another device. The user may have the search result returned to a device where the user intends to view media content corresponding to a result included in the search result. In another embodiment, the search result may be returned to a device used to submit the voice search request (e.g., the computer system 138 or the portable computing device 140), and the user may be presented with an option upon selection of a result from the search result to have media content associated with the search result streamed or sent to a device other than the device used to submit the request (e.g., to the display device 142 via the media device 136).

The processor 114 of the voice search server 102 may receive the voice search request and execute the voice engine 124 to process the voice search request. Identification of a user device that is to receive the search result in response to the voice search request may be received with the voice search request. In some embodiments, user profile information may also be received by the voice search server 102. The user profile information may accompany the voice search request, or the voice search server 102 may retrieve the profile information from a device associated with the request (e.g., the media device 136), from the history database 110, or from a device associated with the service provider.

The voice engine 124 may process the voice search request to identify words, phrases, or both of the voice search vocabulary 120 that correspond to, or may correspond to the voice entry. The identified word or words may be further processed by the voice engine 124 to remove selected words (e.g., common words such as "a", "the" and "and"), to add words phonetically similar to the identified word or words (e.g., if the word "here" is included in the identified word or words, the voice search server 102 may add the word "hear" to the identified word or words), to group two or more words together as a phrase, or combinations thereof. In a particular embodiment, only entries from the voice search vocabulary 120 are used to form the voice search result. Limiting processing of the voice entry to terms identified in the voice search vocabulary 120 may enable efficient, fast, and accurate determination of the voice search result.

The voice search result may be determined with a set of results. Each result may be associated with a probability that the result corresponds to the voice entry. In a particular embodiment, the association set 118 may be used to estimate the probability that each result corresponds to the voice entry. For example, terms of the association set 118 that are associated with more popular programs may be given high weighting, resulting in high probability estimates that the terms correspond to the voice entry. Also, terms of the association set 118 that are associated with less popular programs may be given low weighting, resulting in low probability estimates that the terms correspond to the voice entry. The probability associated with each result may be used to order the voice search results to select one or more words of the voice search vocabulary 120 that are provided to the search engine 126 as the voice search result. Thus, the system 100 may weigh the voice search in a manner that increases the likelihood that a particular voice entry will be understood to be associated with a popular program.

The processor 114 may execute the search engine 126 when the voice search result is formed. The search engine 126 may perform a keyword search of one or more databases (e.g., the EPG database 106 and the media content database 108) based on the voice search result to determine an initial search result. Entries in the initial search result may be ordered based on weight factors retrieved from the association set 118.

The search engine 126 may organize the initial search result to form the search result that is sent to the user device. In an embodiment, the search engine may send a limited number of the best results (e.g., ten results, five results, threes results, or another number of results) as the search result. In a particular embodiment, the search result may be based on the user profile information. The user profile information may include data that specifies user preferences with respect to search results. For example, the user profile may specify a number of search results to be returned, may specify one or more types of programs or selections that are preferred in the search result, may specify one or more types of programs or selections that are not to be returned in the search result (e.g., one or more channels are to be blocked), may specify other information about the search results to be returned to the device, or combinations thereof. The search engine 126 may send the search result to the user device that is to receive the search result.

The user device that receives the search result from the voice search server 102 may further process the search result and send the resulting search result to a display. The display may show information associated with each entry in the resulting search result, including, but not limited to, title, channel, time range of airing of the result, cost associated with the result when applicable, other information, or combinations thereof. The entries may include one or more selectable options that allow corresponding media content to be sent to the user device or another device specified by a user in response to selection of a selectable option.

Figure 2:
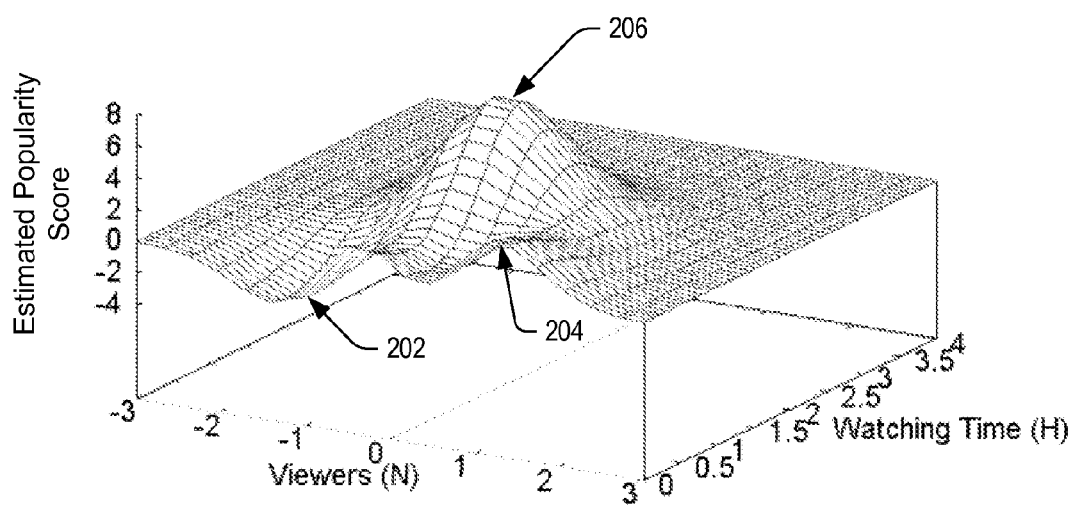
FIG. 2 is a graphical representation of estimated popularity scores used to facilitate a voice search of available media content.

FIG. 2 depicts a graphical representation of estimated popularity scores used to facilitate a voice search of available media content. The estimated popularity scores may be calculated by the elastic spoken language model controller 122 of the voice search server 102 depicted in FIG. 1. In FIG. 2, popularity data for three program groups 202, 204, and 206 is shown. The popularity data may be determined for a time period within the time interval associated with the association set 118 and the voice search vocabulary 120 of FIG. 1. The estimated popularity scores may be calculated from viewing trend data received from the content server 104 as the program groups are aired, from data received from the history database 110, or both. Each program group 202, 204, and 206 may include a single program or a number of associated programs.

A first program group 202 corresponds to an outflow trend. For example, the voice search server 102 may have received data pertaining to the first program group 202 when the demand engine 134 of the content server 104 detected an outflow trend that satisfied the outflow trend threshold. The voice search server 102 may execute the elastic spoken language model controller 122 to calculate a first estimated popularity score for first program group 202. The first estimated popularity score may be below a low threshold for the first program group 202. The elastic spoken language model controller 122 may remove one or more associations from the association set 118 for the program or programs of the first program group 202. When removal of the one or more associations results in the elimination of any association to one or more keywords identifiers in the association set 118, the elastic spoken language model controller 122 may remove one or more keywords corresponding to the one or more keywords identifiers from the voice search vocabulary 120. Thus, terms that are only associated with the first program group may be removed from the voice search vocabulary 120 to improve voice search processing efficiency, speed, and accuracy. The elastic spoken language model controller 122 may also adjust weight factors for any remaining associations to the program or programs of the first program group 202 based on the estimated popularity score for the first program group 202.

The low threshold for the first program group 202 may be reset to the estimated popularity score. Resetting the low threshold to the estimated popularity score may inhibit additional removal of associations from the association set 118 when the estimated popularity score for the first program group 202 is subsequently recalculated during the time interval unless the recalculated estimated popularity score is below the estimated popularity score.

As a result of the estimated popularity score satisfying the low threshold (e.g. the popularity is less than the threshold), relative weights for keywords that are relevant to the program or programs in the first program group 202 during the time interval may be decreased. As an example, viewers leaving a program that is an airing of a football game when one team is beating the other by a large number of points at the beginning of the fourth quarter may result in the program satisfying the outflow trend threshold. Adjustment of the voice search vocabulary 120 to remove one or more associations to the program may give a higher priority to keywords in other content categories besides sports (e.g., movies).

A second program group 204 corresponds to an inflow trend. For example, the voice search server 102 may have received data pertaining to the second program group 204 when the demand engine 134 of the content server 104 detected an inflow trend that satisfied the inflow trend threshold. The voice search server 102 may execute the elastic spoken language model controller 122 to calculate the estimated popularity score for the second program group 204.

The estimated popularity score may satisfy a high threshold for the second program group 204. The elastic spoken language model controller 122 may add associations of one or more additional keyword identifiers to the program or programs of the second program group 204 in the association set 118. In some embodiments, the one or more keywords corresponding to the one or more additional keyword identifiers may be obtained from the EPG database 106, the media content database 108, another database (e.g., the internet movie database (IMDB), or combinations thereof. Weight factors for the keyword identifiers may be set. Keywords corresponding to the additional keyword identifiers may be added to the voice search vocabulary 120 when not already present in the voice search vocabulary 120.

The high threshold for the second program group 204 may be reset to the estimated popularity score. Resetting the high threshold to the estimated popularity score may inhibit adding to the association set 118 when the estimated popularity score for the second program group 204 is subsequently recalculated during the time interval unless the recalculated estimated popularity score is above the estimated popularity score.

As an example of the inflow trend, the second program group 204 may be a showing of a tennis match on a particular channel. When the estimated popularity score for the second program group 204 satisfies the high threshold, additional associations of the second program group 204 with additional keyword identifiers associated with keywords pertaining to tennis may be added to the association set 118. The corresponding keywords may be added to the voice search vocabulary 120 when the keywords are not already in the voice search vocabulary 120. For example, the corresponding keywords may include keywords not previously included in the voice search vocabulary 120, such as "Grand Slam" and "Wimbledon" when the tennis match is part of the Wimbledon tournament, player names, or other information associated with the second program group 204 retrieved from the EPG database 106, an external media source, or both. In spite of an increase in the total number of viewers, the estimated popularity score for the second program group 204 may be relatively low because the content is directed to a relatively narrow subject (i.e., tennis). The net result of the estimated popularity score being above the high threshold may be that coverage for other content categories (e.g., movies) remains substantially unchanged.

A third program group 206 corresponds to a high intensity trend. For example, the voice search server 102 may have received data pertaining to the third program group 206 when the demand engine 134 of the content server 104 detected that a high intensity threshold was satisfied. The voice search server 102 may execute the elastic spoken language model controller 122 to calculate the estimated popularity score for the third program group 206. The estimated popularity score may satisfy a high threshold for the third program group 206. The elastic spoken language model controller 122 may add associations of one or more additional keyword identifiers to the program or programs of the second program group 206 in the association set 118. In some embodiments, the one or more keywords corresponding to the one or more additional keyword identifiers may be obtained from the EPG database 106, the media content database 108, another database (e.g., the internet movie database (IMDB), or combinations thereof. Weight factors for the keyword identifiers may be set. Keywords corresponding to the additional keyword identifiers may be added to the voice search vocabulary 120 when not already present in the voice search vocabulary 120.

The high threshold for the third program group 206 may be reset to the estimated popularity score. Resetting the high threshold to the estimated popularity score may inhibit adding to the association set 118 when the estimated popularity score for the third program group 206 is subsequently recalculated during the time interval unless the recalculated estimated popularity score is above the estimated popularity score.

When the estimated popularity score for the third program group 206 exceeds a second high threshold for the third program group 206, the elastic spoken language model controller 122 may search one or more databases (e.g., the EPG database 106 and the media content database 108) to find identifiers of additional programs or media content, and corresponding identifiers of keywords, that are related to the third program group 206. Identifiers of the additional programs and media content with corresponding keyword identifiers may be added as associations to the association set. Keywords corresponding to the additional keyword identifiers may be added to the voice search vocabulary 120 when not already present in the voice search vocabulary. The associations of the identifiers of the additional programs and media content with the corresponding keyword identifiers may be linked to the third group 206 so that the associations may be removed from the association set when the third program group 206 ends or when a recalculated estimated popularity score for the third group 206 allows for the removal of the associations. The second high threshold for the third group 206 may be reset to the estimated popularity score so that second high threshold for the third group 206 is increased.

As an example of the high intensity trend, the third program group 206 may be an awards program. When the estimated popularity score for the third program group 206 satisfies the high threshold, associations of the third program group 206 to additional keyword identifiers corresponding to keywords pertaining to the awards program (e.g., "best actor", best song", "best movie", etc. when the awards program is the Academy Awards) may be added to the association set 118 and the corresponding keywords may be added to the voice search vocabulary 120 when the keywords are not already in the voice search vocabulary 120. When the estimated popularity score for the third program group 206 is above the second high threshold, the elastic spoken language model controller 122 may search the media content database 108 to determine additional media content that might be of interest to viewers of the third program group 206. For example, the additional media content may be media content nominated for an award, media content that previously won an award, media content that stars nominees of selected awards, etc. The association set 118 may be updated to include associations of identifiers of the media content with identifiers of associated keywords. Keywords corresponding to the identifiers of the associated keywords may be added to the voice search vocabulary 120 when not already present in the voice search vocabulary 120.

Figure 3:
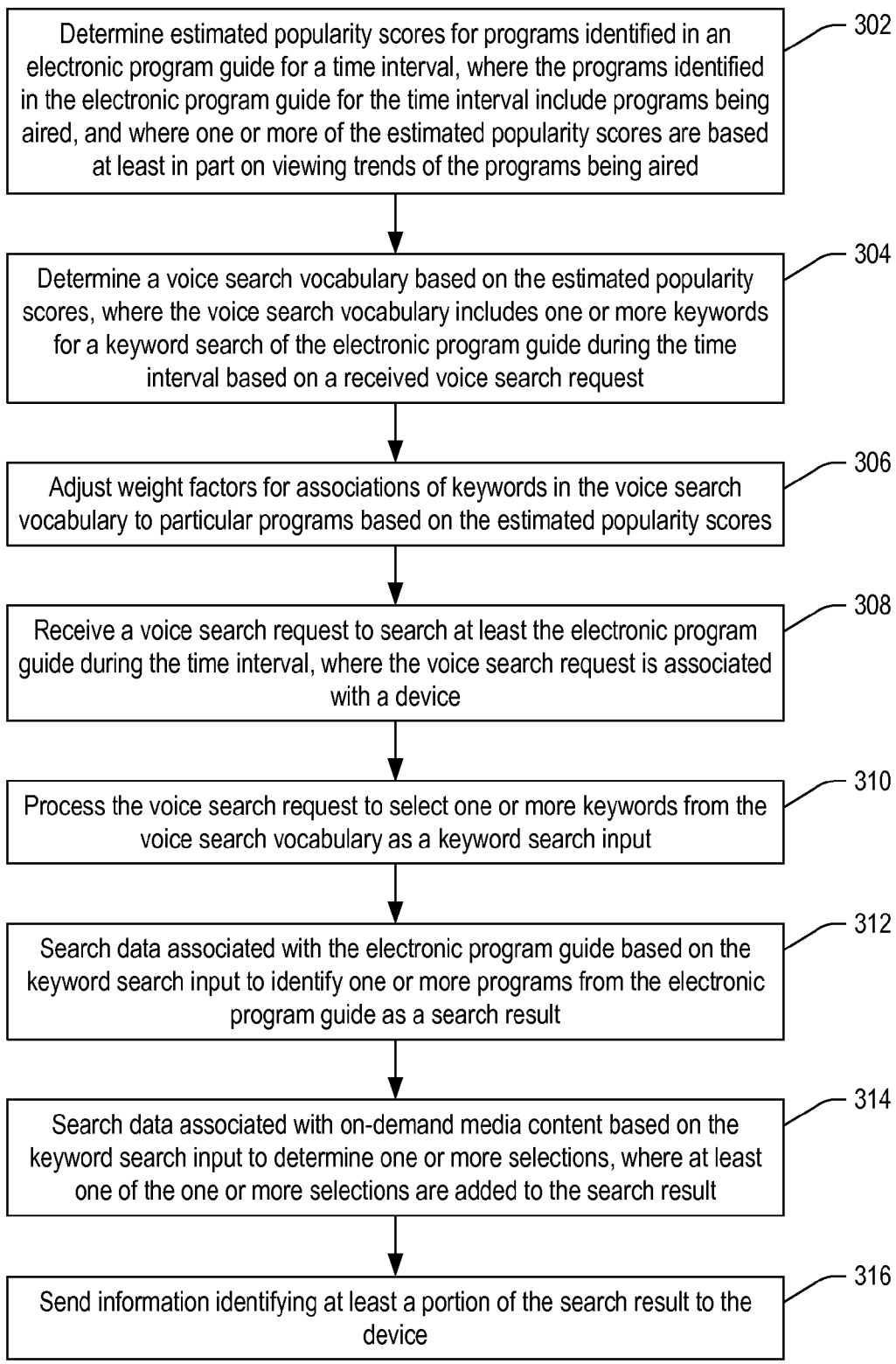
FIG. 3 is a flow chart of a first particular embodiment of a method to facilitate a voice search of available media content.

Referring to FIG. 3, a flow chart of a first particular embodiment of a method to facilitate a voice search of available media content is shown. The method may be performed, for example, by a network server (e.g., by the voice search server 102 depicted in FIG. 1).

At 302, estimated popularity scores for programs identified in an electronic program guide for a time interval are determined. The programs identified in the electronic program guide during the time interval may include programs being aired (e.g., being transmitted, broadcast, or otherwise made available to viewers). One or more of the estimated popularity scores may be based at least in part on viewing trends of the programs being aired. The time interval may be a 15-minute time period, a 30-minute time period, a one-hour time period, a one and a half hour time period, a two-hour time period or another time period set for the network server.

The network server may receive demand ranking data from a content server during the time interval. The demand ranking data may be received at regular intervals, at event driven time points (e.g., 3-minutes after a commercial break ends and 5-minutes before a program ends, or at another event driven time), when one or more thresholds (e.g., an outflow trend threshold, an inflow trend threshold, or a high intensity threshold) are satisfied, or combinations thereof. The network server may use the demand ranking information along with other historical viewing information for various time periods received from a history database to determine the estimated popularity scores for the programs. For a particular program, the historical viewing information may include data related to viewing trends for previous showings of the particular program, data for previous showings of other episodes of the particular program, data for previous viewing trends associated with the channel airing the particular program for the same day of week and time slot, other data related to the particular program or the channel airing the particular program, or combinations thereof. The time periods may be hourly, weekly, monthly, seasonal, or related to particular holidays. For example, data for a particular channel for a time slot a week preceding a time period to be estimated may indicate a large viewing audience. The large audience may be due to the particular channel showing a final episode of a popular show. Since seasonality of the show ended with the showing of the final episode, the historical information for the preceding week may be discounted or disregarded when determining the estimated popularity score of the program currently being aired on the particular channel.

A voice search vocabulary may be determined based on the estimated popularity scores, at 304. The voice search vocabulary may include one or more keywords associated with programs being aired. In an embodiment, the voice search vocabulary may include keywords that correspond to unique keyword identifiers in an association set for the time interval. The association set may include keyword identifiers of keywords associated with program identifiers of programs in the electronic program guide for the time interval. The association set may also include a weight factor for each keyword identifier-program identifier pair in the association set.

At or near the beginning of the time interval, the network server may continue to use the association set from an immediately preceding time interval. The network server may remove entries in the association set for programs that ended in a preceding time interval. The network server may also remove entries in the association set for programs that end during the time interval after the programs end.

New entries in the association set may be made for programs that are new for the time interval along with corresponding identifiers of keywords applicable to the new programs. The identifiers of the keywords may be determined from an electronic program guide database. The network server may search metadata of the electronic program guide database to retrieve identifiers of keywords based on a first set of characteristics. The keywords may be words or phrases. The first set of characteristics may result in the identification of keywords that are commonly used to search for programs in the electronic program guide. The first set of characteristics may include, but is not limited to, words and word phrases from program titles, program genres, channel identifiers (e.g., CNN, ABC, CBS, HBO, NBC, etc.), one or more stars of a programs cast, participating teams or players when a program is a sporting event, other program information, or combinations thereof.

Any program that has an estimated popularity score that satisfies a low threshold for the program may have one or more associations removed from the association set. Initially, all programs may have an initial low threshold. When the estimated popularity score for a particular program satisfies the initial low threshold, the low threshold for the particular program may be reset to the estimated popularity score.

Removal of the one or more association from the association set may reflect a prediction that a viewer using a voice search engine will not want to be directed to the programs with the low estimated popularity scores. The number of associations removed for a particular program with an estimated popularity score at or below the low threshold for the particular program may depend on the estimated popularity score, the number of associations for the particular program, other estimated popularity scores, or combinations thereof. For example, the program or programs with the lowest estimated popularity score for a particular time period may have all associations removed, while another program that is just satisfies the low threshold for the program for the particular time period may have only a limited number of associations removed from the association set (e.g., one association, two associations, five associations, or another number of associations). Which associations are removed for a program that has a low estimated popularity score may be based on characteristics used to determine the keywords. For example, one or more associations to keywords based on characteristics in addition to the first set of characteristics may be removed from the association set before associations to keywords based on the first set of characteristics. Associations to keywords from the first set of characteristics may be removed in a predetermined order when such associations are to be removed (e.g., associations to keywords related to the program title and the channel may be the last associations to be removed).

Any program that has an estimated popularity score that satisfies a high threshold for the program may have one or more associations added to the association set. All programs may have an initial high threshold. When the estimated popularity score for a particular program satisfies the initial high threshold, the high threshold for the particular program may be reset to the estimated popularity score.

Adding the one or more associations may reflect a prediction that a viewer using a voice search engine will want to be directed to programs with high popularity scores. Identifiers of the one or more additional keywords for a program that has an estimated popularity score that satisfies the high threshold for the program may be identifiers of keywords previously removed for the program due to a previous low estimated popularity score for the program. Identifiers of the one or more additional keywords for a program that has an estimated popularity score that satisfies the high threshold for the program may be found in the electronic program guide database based on a second set of characteristics not included in the first set of characteristics. For example, the second set of characteristics may include, but is not limited to, guest stars for programs, directors of programs, words or phrases in episode titles, supporting cast members, plot attributes, other program information, or combinations thereof. In some embodiments, a search of a media data source other than the electronic program guide database (e.g., the media content database 108 depicted in FIG. 1, the IMDB, another media data source, or combinations thereof) for additional keywords, additional media content, or both may be performed when the estimated popularity score satisfies a second high threshold.

The voice search vocabulary may be determined from the association set after removing associations due to low estimated popularity scores and adding associations due to high estimated popularity scores. The voice search vocabulary may include keywords corresponding to unique keyword identifiers in the association set.

Weight factors for associations of keywords in the voice search vocabulary to particular programs may be adjusted based on the estimated popularity scores, at 306. The weight factors may be used by a voice search engine to rank items in a search result when the same keyword or keywords corresponds to more than one program. All entries in the association set may start with an initial value (e.g., 1, 50, or another number). The weight factors may be adjusted up (e.g., for high estimated popularity scores) or down (e.g., for low estimated popularity scores) from the initial value based on an estimated popularity score of the associated program.

A voice search request to search at least the electronic program guide during the time interval may be received, at 308. The voice search request may be associated with a device. For example, the voice search request may be associated with a media device, a computer system, a tablet computer, or other device that is to receive a search result from a search engine. The voice search request may be received by the network server via the device or via a different device. For example, a user may provide a voice entry to a microphone of a remote control device for the media device. The media device may forward a voice search request based on the voice entry to the network server. The media device may receive the search result from the network device. In another example, a user may use a mobile communication device to submit a voice search request to the network server. The user may be presented with an interface on a display of the mobile communication device that allows the user to select which device associated with the user will receive the search result. The user may select the media device to receive the search result.

The voice search request may be processed to select one or more keywords from the voice search vocabulary as a keyword search input, at 310. For example, the network server may process the voice search request to produce a transcription of the voice search request. The resulting transcription may be further processed to remove selected words, to add words phonetically similar to words in the transcription, to group one or more words together as a phrase, or combinations thereof. The resulting transcription may be compared to the voice search vocabulary. In another example, the network server may process the voice search request using a speech to text algorithm to identify words of the voice search vocabulary that are most likely present in the voice search request, where only words in the voice search vocabulary are considered possible to be present in the voice search request. One or more keywords from the voice search vocabulary may be selected based on the comparison as the keyword search input.

Data associated with the EPG may be searched based on the keyword search input to identify one or more programs from the EPG as a search result, at 312. Data associated with on-demand media content may be searched based on the keyword search input to determine one or more selections, at 314. At least one of the one or more selections may be added to the search result.

Information identifying at least a portion of the search result may be sent to the device, 316. In an embodiment, the network server may be configured to send information for a predetermined number of programs and selections identified in the search result (e.g., for 3, 5, 10, or another number of programs and selections). In an embodiment, the network server may receive user profile information along with the voice search request. The user profile information may include data that specifies user preferences with respect to search results. For example, the user profile may specify a number of search results to be returned, may specify one or more types of programs or selections that are preferred in the search result, may specify one or more types of programs or selections that are not to be returned in the search result (e.g., one or more channels are to be blocked), may specify other information about the search results to be returned to the device, or combinations thereof. Information included in the search result sent to the device may be based on the user profile. In some embodiments, the device may process the received search result based on the user profile instead of having the network server process the search result based on the user profile. The device may send information obtained from the search result to a display device.

Figure 4:
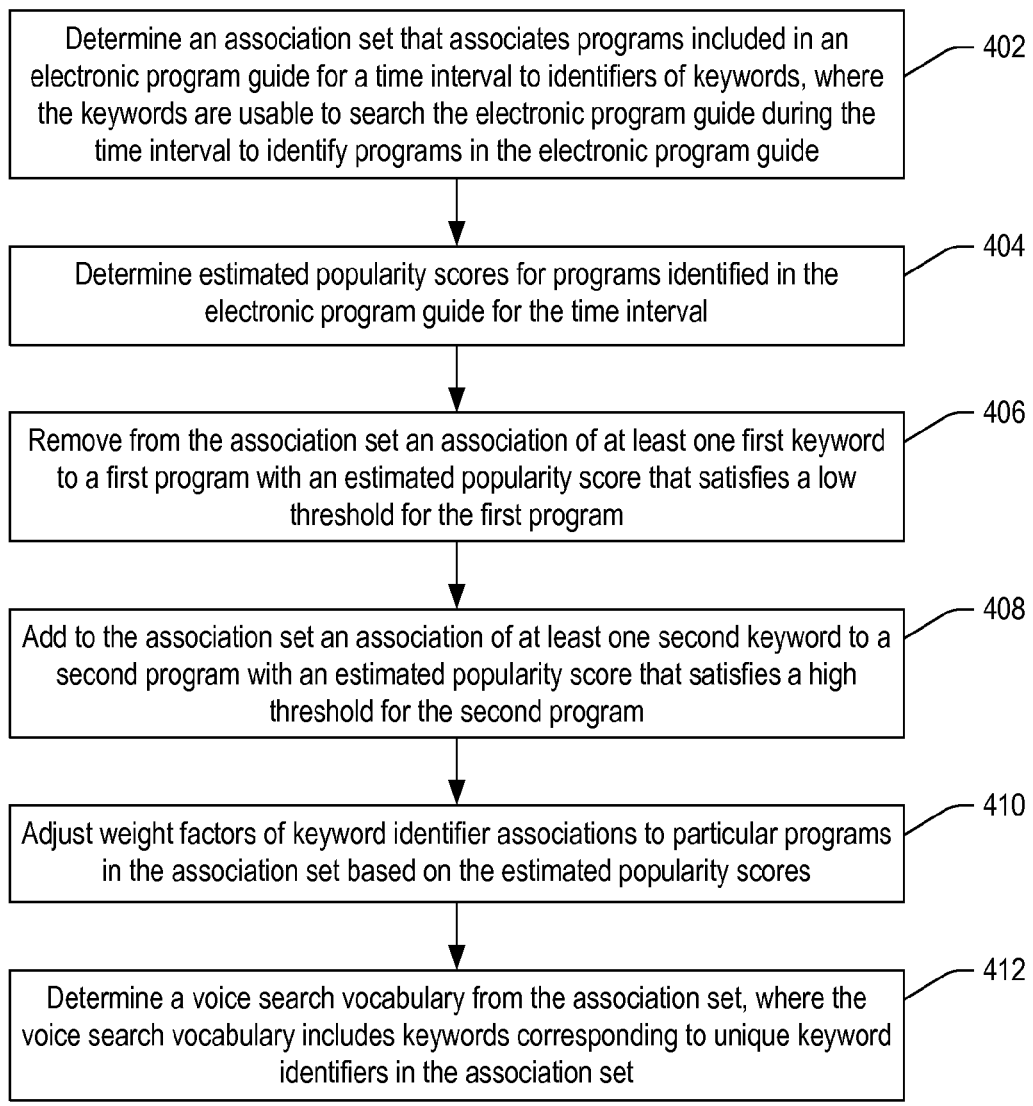
FIG. 4 is a flow chart of a second particular embodiment of a method to facilitate a voice search of available media content.

Referring to FIG. 4, a flow chart of a second particular embodiment of a method to facilitate a voice search of available media content is shown. The method may be performed, for example, by a network server (e.g., by the voice search server 102 depicted in FIG. 1).

At 402, an association set that associates programs included in an electronic program guide for a time interval to identifiers of keywords is determined. The keywords are usable to search the electronic program guide during the time interval to identify programs in the electronic program guide. The time interval may be a 15-minute time period, a 30-minute time period, a one-hour time period, a one and a half hour time period, a two-hour time period or other time period set for the network server. The time interval may include programs currently being aired (e.g., being transmitted, broadcast, or otherwise made available to viewers).

At or near the beginning of the time interval, the network server may determine identifiers of programs that will be available during the time interval. The network server may continue to use the association set from an immediately preceding time interval. The network server may remove entries in the association set for programs that ended in a preceding time interval. The network server may also remove entries in the association set for programs that end during the time interval after the programs end.

New entries in the association set may be made for programs that are new for the time interval along with corresponding identifiers of keywords applicable to the new programs. The identifiers of the keywords may be determined from an electronic program guide database. The network server may search the electronic program guide database to retrieve identifiers of keywords based on a first set of characteristics. The keywords may be words or phrases. The first set of characteristics may result in the identification of keywords that are commonly used to search for programs in the electronic program guide. The first set of characteristics may include, but is not limited to, words and word phrases from program titles, program genres, channel identifiers (e.g., CNN, ABC, CBS, HBO, NBC, etc.), one or more stars of a programs cast, participating teams or players when a program is a sporting event, other program information, or combinations thereof.

Estimated popularity scores for programs identified in the electronic program guide for the time interval may be determined, at 404. The network server may receive demand ranking data from a content provider server. The demand ranking data may be received at regular intervals, at event driven time points (e.g., 3-minutes after a commercial break ends and 5-minutes before a program ends), when one or more thresholds (e.g., an outflow trend threshold, an inflow trend threshold, or a high intensity threshold) are satisfied, or combinations thereof. The network server may use the demand ranking information along with other viewing information for various time periods (e.g., day, month, year, season, holiday) received from a history database to determine the estimated popularity scores for the programs.

An association of at least one first keyword to a first program that has an estimated popularity score that satisfies a low threshold for the first program may be removed from the association set, at 406. Any program that has an estimated popularity score below the low threshold for the program may have one or more associations removed from the association set. All programs may have an initial low threshold. When the estimated popularity score for a particular program satisfies the low threshold, the low threshold for the particular program may be reset to the estimated popularity score so that the low threshold for the program is decreased.

Removal of the one or more association from the association set may reflect a prediction that a viewer using a voice search engine will not want to be directed to the programs with the low estimated popularity scores. The number of associations removed for a particular program with an estimated popularity score at or below the low threshold for the particular program may depend on the estimated popularity score, other estimated popularity scores, or both. For example, the program or programs with the lowest estimated popularity score for a particular time period may have all associations removed, while another program that is near but below the low threshold for the program for the particular time period may have only a limited number of associations removed from the association set (e.g., one association, two associations, five associations, or another number of associations). Which associations are removed for a program that has a low estimated popularity score may be based on characteristics used to determine the keywords. For example, one or more associations to keywords based on characteristics in addition to the first set of characteristics may be removed from the association set before associations to keywords based on the first set of characteristics. Associations to keywords from the first set of characteristics may be removed in a predetermined order when such associations are to be removed.

An association of at least one second keyword to a second program that has an estimated popularity score that satisfies a high threshold for the second program may be added to the association set, at 408. Any program that has an estimated popularity score that satisfies the high threshold for the program may have one or more associations added to the association set. Keywords corresponding to keyword identifiers added to the association set may be added to the voice search vocabulary when not already present in the voice search vocabulary. All programs may have an initial high threshold. When the estimated popularity score for a particular program is satisfies the high threshold, the high threshold for the particular program may be reset to the estimated popularity score so that the high threshold for the particular program is increased.

Adding the one or more associations may reflect a prediction that a viewer using a voice search engine will want to be directed to programs with high popularity scores. Identifiers of the one or more additional keywords for a program that has an estimated popularity score above the high threshold for the program may be identifiers of keywords removed for the program due to a low estimated popularity score for the program. Identifiers of the one or more additional keywords for a program that has an estimated popularity score above the high threshold for the program may be found in the electronic program guide based on a second set of characteristics not included in the first set of characteristics. For example, the second set of characteristics may include, but is not limited to, guest stars for programs, directors of programs, episode titles, supporting cast members, plot attributes, other program information, or combinations thereof. In some embodiments, a search of another database for additional keywords may be performed when the estimated popularity score is at or above a second high threshold.

Weight factors of keyword identifiers associations to particular programs in the association set may be adjusted based on the estimated popularity scores, at 410. The weight factors may be used by a voice search engine to rank voice search results when the same keyword corresponds to more than one program. All entries in the association set may start with an initial value (e.g., 1, 50, or another number). The weight factors may be adjusted up (e.g., for high estimated popularity scores) or down (e.g., for low estimated popularity scores) from the initial value based on an estimated popularity score of the associated program.

A voice search vocabulary may be determined from the association set, at 412. The voice search vocabulary may be provided to a voice search engine. The voice search engine may use the voice search vocabulary to determine a voice search result. The voice search result may be used by a search engine to perform a keyword search of the electronic program guide, an on-demand media content database, another database that identifies media content, or combinations thereof to determine a search result for the received voice search request.

Various embodiments disclosed herein enable a network server (e.g., a voice search server) to facilitate a search of available media content based on keywords determined from a voice search request. Prior to receipt of the voice search request, the voice search server may establish an association set for a time interval corresponding to a block of programming in the EPG. Entries in the association set may be based on estimated popularity scores for programming in the time interval and for selected media content available through the on-demand service. The association set may be used to generate a voice search vocabulary of keywords. The search result for the voice search request may be based on the voice search vocabulary and the association set that are associated with the time interval. Basing the search result on the voice search vocabulary and the association set that apply to the time interval may increase the efficiency of obtaining the search result and the accuracy of the obtained search result.

Figure 5:
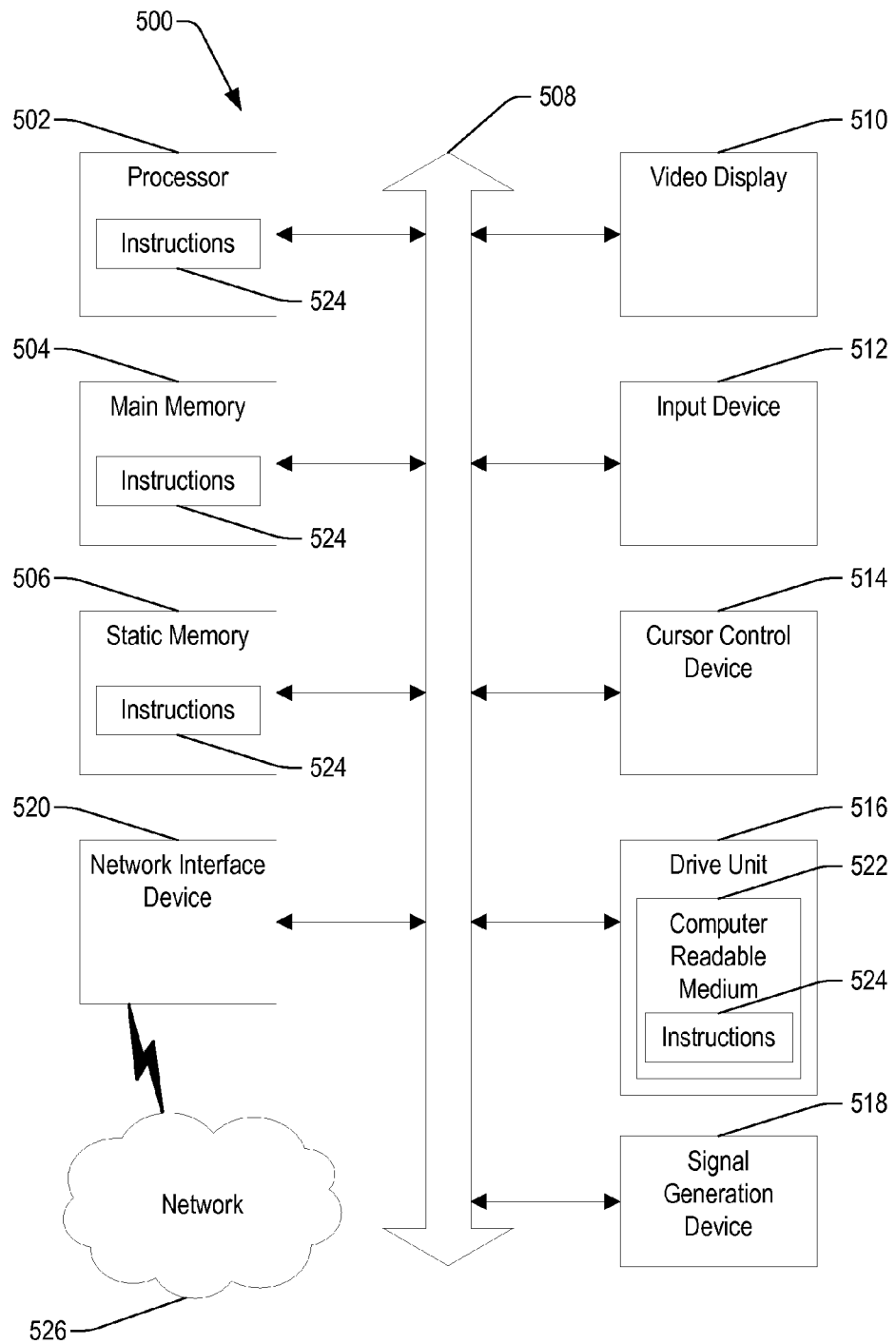
FIG. 5 is a block diagram of an illustrative embodiment of a general computer system.

Referring to FIG. 5, an illustrative embodiment of a general computer system is shown and is designated 500. The computer system 500 may include a set of instructions that can be executed to cause the computer system 500 to perform any one or more of the methods or computer based functions disclosed herein. The computer system 500 may operate as a standalone device or may be connected, e.g., using a network, to other computer systems or peripheral devices. For example, the computer system 500 may include or be included within any one or more of the voice search server 102, the content server 104, the EPG database 106, the media content database 108, the history database 110, the media device 136, the computer system 138, the portable computing device 140, the remote control device 144 and the CPE 146 described with reference to FIG. 1.

In a networked deployment, the computer system 500 may operate in the capacity of a server or as a client user computer in a server-client user network environment, or as a peer computer system in a peer-to-peer (or distributed) network environment. The computer system 500 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a web appliance, or any other machine capable of executing a set of instructions (sequential or otherwise) that specify actions to be taken by that machine. In a particular embodiment, the computer system 500 may be implemented using electronic devices that provide video, audio, or data communication. Further, while a single computer system 500 is illustrated, the term "system" shall also be taken to include any collection of systems or sub-systems that individually or jointly execute a set, or multiple sets, of instructions to perform one or more computer functions.

As illustrated in FIG. 5, the computer system 500 may include a processor 502, e.g., a central processing unit (CPU), a graphics processing unit (GPU), or both. Moreover, the computer system 500 may include a main memory 504 and a static memory 506, which can communicate with each other via a bus 508. As shown, the computer system 500 may further include a video display unit 510, such as a liquid crystal display (LCD), a flat panel display, a solid state display, or a lamp assembly of a projection system. Additionally, the computer system 500 may include an input device 512, such as a keyboard, and a cursor control device 514, such as a mouse. The computer system 500 may also include a drive unit 516, a signal generation device 518, such as a speaker or remote control, and a network interface device 520. Some computer systems 500 may not include an input device (e.g., a server may not include an input device).

In a particular embodiment, as depicted in FIG. 5, the drive unit 516 may include a computer-readable non-transitory storage medium 522 in which one or more sets of instructions 524, e.g. software, can be embedded. Further, the instructions 524 may embody one or more of the methods or logic as described herein. In a particular embodiment, the instructions 524 may reside completely, or at least partially, within the main memory 504, the static memory 506, and/or within the processor 502 during execution by the computer system 500. The main memory 504 and the processor 502 also may include computer-readable non-transitory storage media.

In an alternative embodiment, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations may include distributed processing, component/object distributed processing, and parallel processing. Alternatively, virtual computer system processing may be constructed to implement one or more of the methods or functionality as described herein.

The present disclosure contemplates a tangible computer-readable non-transitory storage medium 522 that stores instructions 524 or receives, stores and executes instructions 524, so that a device connected to a network 526 may communicate voice, video or data over the network 526. While the tangible computer-readable storage medium is shown to be a single medium, the term "tangible computer-readable medium" includes a single medium or multiple media, such as a centralized or distributed database, and/or associated caches and servers that store one or more sets of instructions. The term "tangible computer-readable medium" shall also include any medium that is capable of storing a set of instructions for execution by a processor or that cause a computer system to perform any one or more of the methods or operations disclosed herein.

In a particular non-limiting, exemplary embodiment, the tangible computer-readable storage medium may include a solid-state memory such as a memory card or other package that houses one or more non-volatile read-only memories. Further, the tangible computer-readable storage medium may be a random access memory or other volatile re-writable memory. Additionally, the tangible computer-readable storage medium may include a magneto-optical or optical medium, such as a disk or tapes or other storage device. Accordingly, the disclosure is considered to include any one or more of a tangible computer-readable storage medium and other equivalents and successor media, in which data or instructions may be stored.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, IEEE 802.x) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
   receiving, by a server associated with a service provider, data from a content provider server, the data indicating a program viewing trend of a program being aired when a viewing threshold value of the program is satisfied, wherein the program is identified in an electronic program guide, and wherein the viewing threshold value is a ratio that is based on a first number of first viewers joining the program and a second number of second viewers leaving the program;
   estimating, by the server, an estimated popularity scores of the program based on the data; and
   selecting, by the server, a keyword to be included in a set of search keywords based on the estimated popularity score, wherein the set of search keywords is searchable to locate a particular keywords of a voice search request of the electronic program guide.

2. The method of claim 1, further comprising adjusting weight factors associated with the set of keywords based on the estimated popularity score.

3. The method of claim 1, further comprising:
   receiving a voice search request to search the electronic program guide, wherein the voice search request is associated with a device;
   processing the voice search request to select one or more keywords from the set of keywords as a keyword search input;
   searching data associated with the electronic program guide based on the keyword search input to identify one or more programs from the electronic program guide as a search result; and
   sending information identifying at least a portion of the search result to the device.

4. The method of claim 3, further comprising:
   searching data associated with on-demand media content based on the keyword search input to determine one or more selections, wherein the search result includes at least one of the one or more selections.

5. The method of claim 1, wherein selecting the keyword comprises adding one or more additional keywords to the set of keywords, wherein the one or more additional keywords are associated with a particular program with particular estimated popularity score that satisfies a first threshold of the particular program.

6. The method of claim 5, wherein the one or more additional keywords are added by accessing a media data source to obtain supplemental information descriptive of the one or more programs with estimated popularity scores that satisfy a second threshold of the particular program.

7. The method of claim 1, further comprising:
   removing an association of at least one keyword to a particular program with particular estimated popularity score that satisfies a low threshold of the particular program; and
   removing the at least one keyword from the set of keywords when the at least one keyword is not associated with at least one program identified in the electronic program guide.

8. The method of claim 1, further comprising adding one or more additional keywords to the set of keywords, wherein the one or more additional keywords correspond to particular keywords associated with media content determined from a media data source other than the electronic program guide.

9. The method of claim 1, wherein the estimated popularity score is based on at least one of a change of a number of viewers of the program, a viewing intensity associated with the program, a time of day, a day of week, seasonality, and whether a day the program is airing is a holiday.

10. A system comprising:
    a processor; and
    a memory coupled to the processor, the memory comprising instructions executable by the processor to perform operations comprising:
       receiving data from a content provider server, the data indicating a program viewing trend of a program being aired when a viewing threshold value of the program is satisfied, wherein the program is identified in an electronic program guide, and wherein the viewing threshold value is a ratio that is based on a first number of first viewers joining the program and a second number of second viewers leaving the program
       estimating an estimated popularity score of the program based on the data; and
       selecting a keyword to be included in a set of search keywords based on the estimated popularity score, wherein the set of search keywords is searchable to locate a particular keyword of a voice search request of the electronic program guide.

11. The system of claim 10, wherein the operations further comprise adjusting weight factors associated with the set of keywords based on the estimated popularity score.

12. The system of claim 10, wherein the data is received at regular time intervals from the content provider server.

13. The system of claim 10, wherein the data is received from the content provider server in response to an event driven time during airing of the program.

14. The system of claim 10, wherein the data is received from the content provider server when at least one threshold associated with a particular program group is satisfied.

15. The system of claim 14, wherein the at least one threshold comprises an outflow trend threshold, wherein the outflow trend threshold is satisfied when a total number of viewers leaving the particular program group during a first time period exceeds a total number of viewers tuning to the particular program group during the first time period by a selected ratio.

16. The system of claim 14, wherein the at least one threshold comprises an inflow trend threshold, wherein the inflow trend threshold is satisfied when a total number of viewers joining the particular program group during a first time period exceeds a total number of viewers leaving the particular program group during the first time period by a selected ratio.

17. The system of claim 10, wherein the operations further comprise:
receiving the voice search request;
processing the voice search request to select one or more keywords from the set of keywords as a voice search result;
searching data associated with the electronic program guide based on the voice search result to identify one or more recommended programs from the electronic program guide; and
sending information identifying at least one of the one or more recommended programs to a device.

18. The system of claim 17, wherein the operations further comprise:
searching data associated with on-demand media content based on the voice search result to determine one or more recommended selections from the data; and
sending information identifying at least one of the one or more recommended selections to the device.

19. A computer readable storage device comprising instructions, that when executed by a processor, cause the processor to perform operations comprising:
receiving from a content provider server data indicating a program viewing trend of a program being aired when a viewing threshold value of the program is satisfied, wherein the program is identified in an electronic program guide, and wherein the viewing threshold value is a ratio that is based on a first number of first viewers joining the program and a second number of second viewers leaving the program;
estimating an estimated popularity score based on the data; and
selecting a keyword to be included in a set of search keywords based on the estimated popularity score, wherein the set of search keywords is searchable to locate a particular keyword of a voice search request of the electronic program guide.

20. The computer readable storage device of claim 19, wherein the operations further comprise:
determining an association set that associates the program to keyword identifiers;
adding to the association set at least one first keyword identifier associated with the program when the estimated popularity score satisfies a high threshold of the program; and
removing at least one second keyword identifier associated with the program from the association set when the estimated popularity score satisfies a low threshold of the program.

* * * * *